United States Patent Office 2,848,494
Patented Aug. 19, 1958

2,848,494

PROCESS FOR CONVERTING OPTICALLY ACTIVE AMINODIOLS INTO RACEMIC AMINODIOLS

Carlo Giuseppe Alberti and Alberto Vercellone, Milan, and Giovanni Larini and Luigi Bernardi, Settimo Torinese, Italy, assignors to Società Farmaceutici Italia, a corporation of Italy No Drawing. Application March 30, 1956
Serial No. 574,971

Claims priority, application Italy March 31, 1955

2 Claims. (Cl. 260—562)

This disclosure relates to a process for converting optically active aminodiols into racemic aminodiols.

The synthesis of chloramphenicol or D-threo-1-p-nitrophenyl-2-dichloroacetamido - 1,3 - propanediol always results in racemic compounds and at a certain stage of the chloramphenicol synthesis it is necessary to separate optical antipodes to obtain the D-threo derivative. When splitting threo-phenylaminodiols into the optical antipodes, the D-antipode is employed for continuing the synthesis, whereas until now the L-antipode had to be discarded as useless; on the other hand, when operating with erythro-phenylaminodiols, the L-antipode is employed and the D-antipode is discarded. Obviously, both forms could be utilized if it were possible to racemize them.

In the co-pending U. S. patent application Serial No. 432,034 of May 24, 1954, now abandoned, of which this application is a continuation-in-part, a process is claimed for the conversion of D- and/or L-threo and/or erythro 1-p-nitrophenyl-2- amino-1,3-propanediol into D,L-threo-1-p-nitrophenyl-2-amino - 1,3 - propanediol, characterized in that the compound to be converted is transformed, by means of a reaction that eliminates at least one of the asymmetries in the chain of the starting compound, into an optically inactive derivative on which the original chain, accompanied by epimerization if required, is re-built. This co-pending application discloses and claims the operations, conditions and combination variations summarized in a reaction scheme that has been made part of this disclosure and which includes, as part of the process steps, a reaction of addition between anhydrous halogenhydric acids dissolved in inert solvents and p-nitro-α-acylamino-acrylophenone (5), resulting in p-nitro-α-acylamino-β-halogenpropiophenones (6). This reaction is followed by a reduction to 1-p-nitrophenyl-2-acylamino-3-halogen-propane-1-ols and a transformation of the latter into 1-p-nitrophenyl-2-acylamino-1,3-propanediols (8). The object of the present continuation-in-part application is to carry out a reaction of addition between p-nitro-α-acylamino-acrylophenone (5) and another class of substances, different from the halogenhydric acids, but also providing derivatives that are easily transformable into 1-p-nitrophenyl-2-acylamino-1,3-propanediols (8). As we now have found, such substances are the lower aliphatic alcohols, which, in the presence of a basic catalyst and under, preferably, slight heating, provide D,L-p-nitro-α-acylamino-β-alkoxy-propiophenones (6')

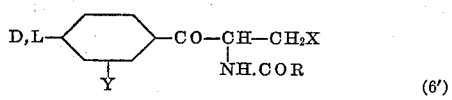

(6')

wherein X represents alkoxy and Y represents H and $NO_2$.

Suitable as basic catalysts are alkaline metal hydroxides, salts of alkaline metals with weak acids (sodium acetate), alkaline metals alcoholates, tertiary amines, and others.

The p - nitro-α-acylamino - β - alkoxy - propiophenones (6') thus obtained may then be reacted with alkaline metal borohydrides in alcoholic, aqueous-alcoholic or aqueous solution, or with aluminum alcoholate in the presence of an excess of alcohol. The ketonic group of compound 6' is thus reduced to an alcoholic group, providing a mixture of D,L-threo- and erythro-1-nitrophenyl-2-acylamino-3-alkoxy-propane-1-ols (7'), that can be separated by fractional crystallization from a solvent in which the two diastereoisomers have such a difference of solubility so as to permit a practical separation.

Suitable for this purpose are for example water and the lower alcohols (methanol, ethanol; isopropanol), or mixtures thereof with water.

The erythro diastereoisomers are transformed into the threo diastereoisomers by means of treatment with a dehydrating substance such as, for example, $SOCl_2$, $PCl_5$, $H_2SO_4$, preferably in the presence of an inert diluent such as benzol or chloroform, at a temperature between 0° and 25° C., followed by treatment with a cold, diluted alkali (sodium or potassium carbonate or bicarbonate), resulting in threo-1-p-nitrophenyl-2-acylamino-3-alkoxy-propane-1-ols, or, when slightly heated with water, the treatment results in threo-1-nitrophenyl-2-amino-3-alkoxy-propane-1-ols or their salts. From these 3-alkoxy-aminopropanols the 1-p-nitrophenyl-2-amino-1,3-propanediols are obtained in the known manner (see M. C. Rebstock, J. Org. Chem. 19, 851 (1954)) by means of a prolonged heating with mineral acids at high temperatures.

Some of the herein disclosed substances contain one or two asymmetric carbon atoms and such compounds, as known, may exist as dextro-, levo- and racemic derivatives and, in case of two asymmetric carbon atoms, each of these derivatives may exist in the erythro form (also designated as the reg. or cis form) and in the threo form (also designated as pseudo or trans form). Therefore, the present specification and the appended claims relate to either of said derivatives and to any of said forms, if not differently specified.

As an illustration of the present invention, the following example is provided without intention, however, of limiting the invention thereto.

Example 23.4 gr. of p.nitro-α-acetamino-acrylo-phenone are refluxed for two hours with a solution of 8.2 gr. of molten sodium acetate in 250 cc. of methanol. The reaction mixture is decolorized with carboraffin, diluted with 500 cc. of water and extracted with ethyl acetate. After a further decoloration with carboraffin, the extract is evaporated to dryness. Crystallization of the residue from ethanol yields D,L-p.nitro-α-acetamino-β-methoxy-propiophenone, M. P. 138–139° C. 5.0 gr. of D,L-p.nitro-α-acetamino-β-methoxy propiophenone are suspended in 20 cc. of methanol and treated with 0.25 gr. of $H_4NaB$ dissolved in methanol. The mixture is evaporated under vacuum and the residue crystallized from water. The monohydrate of D,L-erythro-1-p.nitrophenyl-2-acetamino-3-methoxypropane-1-ol is obtained, having a M. P. of 114–117° C., and from the mother-liquor D,L-threo-1-p.nitrophenyl-2-acetamino-3-methoxypropane-1-ol, having a M. P. of 156° C.

D,L-erythro-1-p.nitrophenyl-2-acetamino - 3 - methoxypropane-1-ol is dissolved in $SOCl_2$ and kept at 0° C. for 3 hours. It is then poured into a cold solution of sodium carbonate. After extraction with ethyl acetate and crystallization from water, D,L-threo-1p.nitrophenyl-2-acetamino-3-methoxy-propane-1-ol is obtained having a M. P. of 155–156° C. Upon heating this last named material in a closed tube at 120° C. for 4 hours with 25% HCl and alkalizing with NaOH to a pH of 11–12, D,L-threo-1-p.nitrophenyl-2-amino-1,3-propanediol is recovered, having a M. P. of 139–140° C. If the product of the reaction with SOCl₂ is decomposed with water and kept on a boiling water-bath for 30 minutes, upon cooling, D,L-threo-1-p-nitrophenyl-2-amino-3-methoxy-propane-1-ol-hydrochloride is obtained (M. P. 219–220° C.). Adding caustic soda to an aqueous solution thereof, the base precipitates in the form of bright scales, having a M. P. of 136–137° C. The erythro base, obtained by saponification of D,L-erythro-1-p-nitrophenyl-2-acetamino-3-methoxy-propane-1-ol, melts at 103–104° C. (the hydrochloride at 250–251° C.).

While according to the afore-said copending application X in the above formulas represents Cl, Br, J, according to this disclosure X represents alkoxy (methoxy).

Y represents $NO_2$ or H and R, R' represent alkyl, haloalkyl, aralkyl and H.

We claim:

1. The process for converting a compound of the group consisting of the L-threo and D-erythro-isomers of 1-p-nitrophenyl-2-amino-1,3-propanediol to the D,L-threo-isomer, which comprises dissolving a p.nitro-α-RCO-amino-acrylophenone, wherein R represents a member

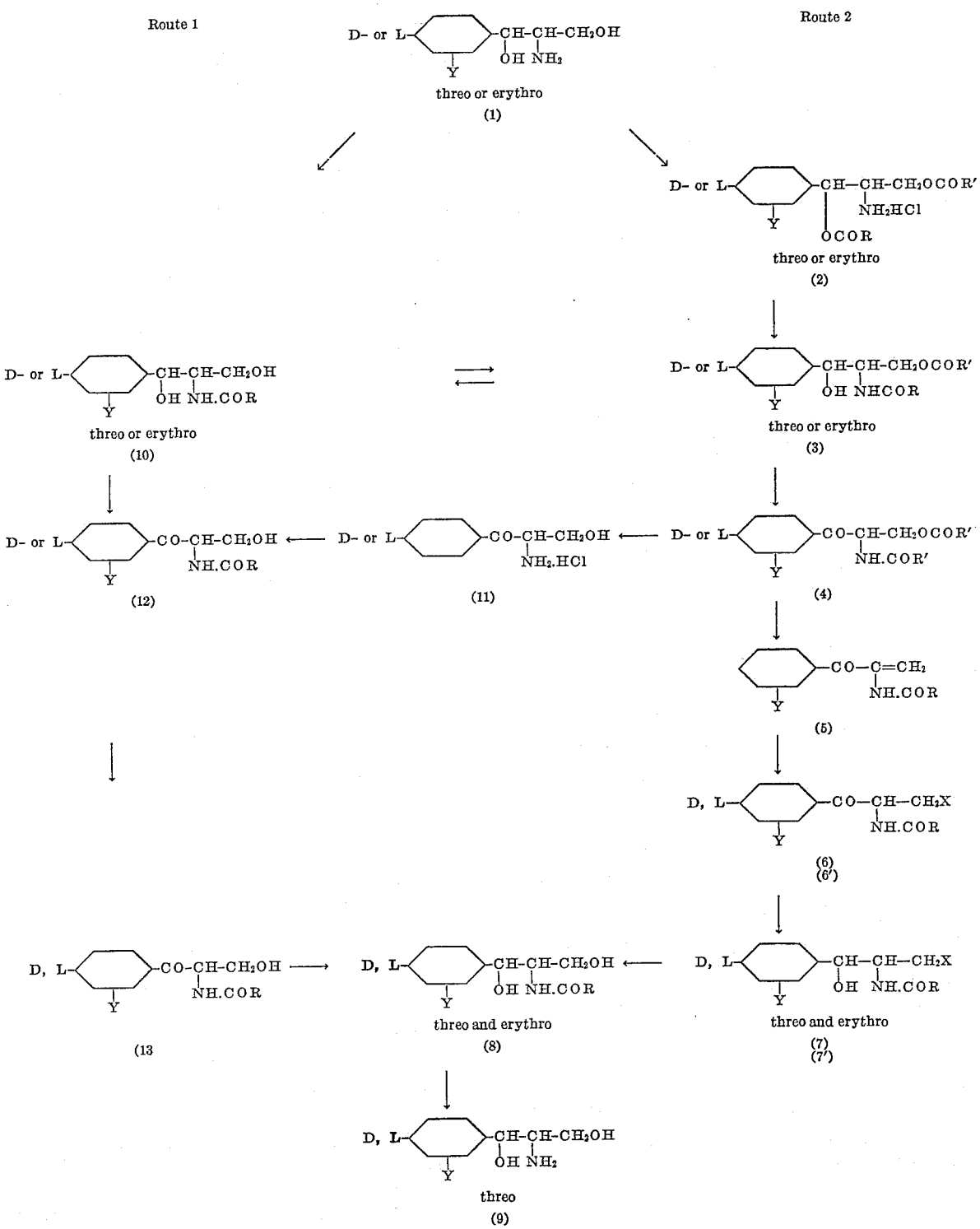

of the group consisting of alkyl having from 1 to 4 carbon atoms, phenyl and dichloromethyl, in a lower aliphatic alcohol selected from the group consisting of methyl and ethyl alcohol, refluxing in the presence of a basic catalyst taken from the group consisting of alkaline metal hydroxides, salts of alkaline metals with an acid selected from the group consisting of carbonic, bicarbonic and acetic acid, alkaline metal alcoholates selected from the group consisting of methylates and ethylates and tertiary amines selected from the group consisting of triethylamine and N-ethyl piperidine, adding water, extracting with a water-insoluble solvent, recovering D,L-p.nitro-α-acylamino-β-alkoxy-propiophenone, treating each part by weight of said D,L-p.nitro-α-acylamino-β-alkoxy-propiophenone with about 0.05 part by weight of an alkaline metal borohydride in aqueous and alcohol-aqueous solution at room temperature, separating D,L-threo- and erythro-diastereoisomers of 1-p.nitrophenyl-2-RCO-amino-3-alkoxy-propane-1-ol from the solution and from each other by fractional crystallization, converting the erythro-diastereoisomer into the threo diasteroisomer by treating at a temperature from 0 to 25° C. and in the presence of chloroform as diluent with a dehydrating agent taken from the group consisting of $SOCl_2$, $PCl_5$, $H_2SO_4$, treating with a cold dilute alkali solution and separating threo-1-p-nitrophenyl-2-acylamino-3-alkoxy-propane-1-ol.

2. The process for converting a compound of the group consisting of the D-threo-, L-threo-, D-erythro- and L-erythro isomers of 1-p-nitrophenyl-2-amino-1,3-propanediol to the D,L-threo-isomer, which comprises dissolving p.-nitro-α-acetamido-acrylophenone in methanol, refluxing in the presence of molten sodium acetate, adding water, extracting with ethyl acetate, recovering D,L-p.nitro-α-acetamido-β-methoxy propiophenone, treating each part by weight of said D,L-p.nitro-α-acetamido-β-methoxy-propiophenone with about 0.05 part by weight of $H_4NaB$ in aqueous methanol at room temperature to reduce the ketonic group to an alcohol group, separating D,L-threo- and erythro-diastereoisomers of 1-p.nitrophenyl-2-acetamido-3-methoxy-propane-1-ol from the solution and from each other by crystallization from an aqueous solution wherein the monohydrate of D,L-erythro-1-p.nitrophenyl-2-acetamido-3-methoxy-propane-1-ol is the less soluble compound, converting the erythro diastereoisomer into the threo diastereoisomer by treating at a temperature from 0 to 25° C. and in the presence of chloroform as diluent with $SOCl_2$, treating with a cold dilute sodium carbonate solution and separating D,L-threo-1-p-nitrophenyl-2-acetamino-3-methoxy-propane-1-ol.

References Cited in the file of this patent

FOREIGN PATENTS 1,105,048    France _____ June 22, 1955

OTHER REFERENCES

Rebstock: "J. Org. Chem.," vol. 19, May 1954, pages 851 to 856.